United States Patent [19]

Vidal et al.

[11] 4,309,451

[45] Jan. 5, 1982

[54] LIQUID ANTIMICROBIAL TREATMENT FOR STORAGE GRAIN

[75] Inventors: Frederick D. Vidal, Englewood Cliffs; Anantharaman Jayaraman, Nutley, both of N.J.

[73] Assignee: Pennwalt Corporation, Philadelphia, Pa.

[21] Appl. No.: 156,501

[22] Filed: Jun. 4, 1980

Related U.S. Application Data

[62] Division of Ser. No. 50,162, Jun. 20, 1979, abandoned.

[51] Int. Cl.³ .................... A23B 9/00; A01N 59/00
[52] U.S. Cl. .................................. 426/331; 426/335; 424/128; 424/161; 424/166
[58] Field of Search ............... 426/321, 331, 335, 312, 426/319, 320, 532, 442, 618; 424/317, 161, 162, 164, 166, 175, 149, 127, 128

[56] References Cited

U.S. PATENT DOCUMENTS

| | | | |
|---|---|---|---|
| 1,222,830 | 4/1917 | Werner | 426/618 |
| 1,524,494 | 1/1925 | Warth | 424/162 |
| 1,777,044 | 9/1930 | Legendre | 424/166 |
| 2,132,786 | 10/1938 | Hockenyos | 424/162 |
| 2,912,793 | 11/1959 | Stone et al. | 424/162 |
| 3,404,987 | 10/1968 | Kooistra et al. | 424/317 |
| 3,928,577 | 12/1975 | Kochurova et al. | 424/162 |
| 3,962,475 | 6/1976 | Forest et al. | 426/331 |

OTHER PUBLICATIONS

*Chemical Abstracts*, vol. 87, No. 19, 1977, p. 451, Abstract No. 150449p, Petrosyan, V. A. et al., "Preservation of Feeds Cured to Various Moisture Content".
*Chemical Abstracts*, vol. 72, No. 1, 1970, p. 203, Abstract No. 2303m, Petrosyan, V. A., "Use of Sulfur Preparations to Preserve Green Fodder".
*Chemical Abstracts*, vol. 66, No. 7, 1967, p. 2616, Abstract No. 2779k, Taranov, M. T. et al., "Chemical Conservation of Corn Feeds and Motley Grass with N-Containing and S-Containing Substances".
Landrooth et al., *Thermodynamics*, vol. 88, 1976, p. 427, "Thermodynamics of the Reaction of Ammonia and Sulfur Dioxide in the Presence of Water Vapor".
Zelionkaite et al., *Chemical Abstracts*, vol. 76, 1972, p. 329, "Decomposition of Ammonium Hydrosulfite Solutions Under the Action of Thiosulfate".
Scargill, *Air Pollution Industrial Hygiene*, vol. 75, 1971, p. 167, "Dissociation Constants of Anhydrous Ammonium Sulfite and Ammonium Pyrosulfite Prepared by Gas Phase Reactions".
Chertkov, *Chemical Abstracts*, vol. 53, 1959, cols. 22770-22771, "Kinetics of the Autodecomposition of Ammonium Bisulfite-Sulfite Solutions".
Chertkov, *Zhur. Priklad. Khim.*, 32, 1732-1742, 1959, "Kinetics of Spontaneous Decomposition of Ammonium Sulfite-Bisulfite Solutions".
Najbar et al., *Catalyst Kinetics*, vol. 78, 1973, p. 309, "Kinetics and Stoichiometry of the Heterophase Reaction Sulfur Dioxide with Ammonia".
Hisatsune, *Chemical Abstracts*, vol. 83, 1976, p. 600, "Infrared Spectroscopic Study of the Ammonia-Sulfur Dioxide-Water Solid State System".
Mizoguchi et al., "Bul. of the Chem. Soc. of Japan, vol. 49(1), 1976, pp. 70-75, "The Chemical Behavior of Low Valance Sulfur Compounds".
Chertkov et al., *Soviet Chemical Industry*, vol. 49(6), 1973, pp. 383-387, "Spontaneous Decomposition of Concentrated Ammonium Sulfite-Bisulfite Solutions".
Kirk et al. editors, *Encyclopedia of Chemical Technology*, vol. 14, pp. 90-91, pub. The Interscience Encyclopedia Inc., New York, "Thionic Acids".
M. Goehring, Ergebnisse and Probleme der Chemie der Schwefelstickstoffverbindungen, Akademie Verlag, Berlin 1957, pp. 138-141.

*Primary Examiner*—Raymond N. Jones
*Assistant Examiner*—Elizabeth J. Curtin
*Attorney, Agent, or Firm*—Woodcock, Washburn, Kurtz, Mackiewicz & Norris

[57] ABSTRACT

Process to prevent the growth of microorganisms in moist storage grains by treating the grain with an aqueous solution of ammonium bisulfite containing an amount of sodium hexametaphosphate which is effective to increase the growth inhibiting properties of said solution.

4 Claims, No Drawings

LIQUID ANTIMICROBIAL TREATMENT FOR STORAGE GRAIN

This is a division of application Ser. No. 50,162, filed June 20, 1979, now abandoned.

The present application is also related to application Ser. No. 38,739, filed May 14, 1979 entitled "Gaseous Antimicrobial Treatment of Storage Grains", to application Ser. No. 163,413, filed June 26, 1980 entitled "Liquid Anti-Microbial Treatments for Storage Grain", and to application Ser. No. 163,410, filed June 26, 1980 entitled "Gaseous Anti-Microbial Treatments of Storage Grain."

This invention relates to antimicrobial treatment of storage grains, and more particularly, it relates to a treatment in which the storage grains are subjected to an aqueous solution comprising ammonium bisulfite and another inorganic sulfur compound.

It is well known that grains such as corn, wheat, sorghum, and the like must be stored at various times and locations from the time they are harvested to their eventual conversion into a consumers product such as flour, molasses, etc. These grains are always subject to the possibility of microbial growth because they are moist and contain the organisms which will multiply under the natural conditions of storage. It is, or course, very important to inhibit such growth in order to prevent unnecessary wastage of food. Normally the grain is treated with a dry dust or with a liquid spray of suitable antimicrobial material in order to accomplish this purpose. It has now been found that treatment with an aqueous solution containing ammonium bisulfite and another sulfur compound can accomplish this purpose more economically and efficiently.

It is an object of this invention to provide an improved process for treating storage grains with antimicrobial material. It is another object of this invention to provide an improved process for treating storage grains with an aqueous solution of antimicrobial material. Still other objects will appear from the more detailed description of this invention which follows.

In accordance with this invention there is provided a process for treating storage grains to inhibit the growth of microorganisms which comprises treating the grain with an aqueous solution of ammonium bisulfite and another sulfur compound, the total amount of bisulfite and sulfur compounds being from 0.1 to 5 parts by weight per 100 parts of grain. In embodiments of this invention there are employed combinations of ammonium bisulfite and any other bisulfite, bisulfate, metabisulfite, dithionate, polythionates, sulfite, thiosulfate or imidodisulfonate. In other embodiments of this invention the aqueous solution is at a pH of 3-5. In still other embodiments there is included as an additional component of the solution a lower aliphatic acid.

The process of this invention relates to the treatment of any grain which is subjected to storage in bulk under moist conditions. Such grains include wheat, corn, sorghum, oats, rye, soybeans, etc. Normally such grains contain 15-40% of moisture. When the grains contain moisture they are particularly suitable for the growth of microorganisms.

The process of this invention involves subjecting the grain to the action of an aqueous solution of ammonium bisulfite and another sulfur compound in an amount to produce antimicrobial activity, which is 0.1 to 5 parts of bisulfite plus sulfur compound per 100 parts by weight of grain.

The solution is introduced into the volume of storage grain in any convenient manner which will produce the most intimate contact between the grain and the liquid. This may be accomplished most conveniently by spraying or misting the solution into the stream of grain entering a storage bin.

The additional sulfur compound may be any of a variety of soluble salts such as the alkali metal or ammonium salts wherein the anion is bisulfite, bisulfate, metabisulfite, dithionate, trithionate, higher polythionates, thiosulfate, sulfite and/or imidodisulfonate.

In some instances it has been found that a third component in the aqueous solution is advantageous; namely, a lower aliphatic carboxylic acid. By "lower aliphatic" is meant those compounds having 1-4 carbon atoms. Therefore, acids such as formic, acetic, propionic, butyric, fumaric, maleic, malic, malonic and succinic are included.

The concentration of components in the aqueous solution of this invention may vary from about 10% to about 50%. In the preferred embodiments the ammonium bisulfite is present in a concentration of 20-50%, most preferably 30-50%; and the carboxylic acid in a concentration of 0-20%. The pH of the aqueous solution should be from 3 to 5.

The amount of salts and acid applied to the grain is 0.5-5% by weight of the grain.

A 50% solution of ammonium bisulfite stored at ambient temperature for several years (designated as Old) showed a higher degree of antimicrobial activity (10 times) than fresh solutions. Being a dynamic system with equilibria shifting with changes in conditions, the ammonium bisulfite disproportionates into several other related compounds and undergoes a lowering of pH due to oxidation. Upon analysis the "old" ammonium bisulfite is found to contain, besides major amount of bisulfite, the following compounds in the amount 1-10%—ammonium bisulfite, thiosulfate, metabisulfite, dithionate, imidodisulfonate and different polythionates.

In order to ascertain that the increased antimicrobial activity of the "old" ammonium bisulfate was due to the other related compounds, these compounds were added to a fresh solution of ammonium bisulfite. The results in Tables I, II and III show that there is matching of the antimicrobial activity of the "old" ammonium bisulfite by the synthetic approach. In the same vein it was tried to "age" the fresh ammonium bisulfite by means of heat, UV irradiation and ultrasonication with some success. Since there could not be control of the degree of disproportionation and formation of synergistic compounds by such physical means, the antimicrobial activity of the "aged" fresh ammonium bisulfite did not fully match that of the "old" ammonium bisulfite.

Among the most effective combinations were:
(1) 50% Sodium metabisulfite + 50% NH$_4$HSO$_3$
(2)*20% Propionic acid + 50% NH$_4$HSO$_3$
(3)*10% Acetic acid + 10% propionic acid + 50% NH$_4$HSO$_3$
(4)*20% Methylene-bis-propionate + 50% NH$_4$HSO$_3$
(5) Heating at 50° C. for 2 days 50% NH$_4$HSO$_3$ fresh, pH 3
(6) 50% NH$_4$HSO$_3$ (Fresh) + 10% sodium hexametaphosphate

* These solutions have an additional 30% water.

A pH of about 3.0 seems to be the optimum for highest antimicrobial activity. Low pH probably results in a slow release of free $CO_2$, adding to the synergism.

The high potency of the "old" or artificially "aged" or synthetic formulations may be attributable to the sulfur being in oxidation state of 5 in addition to other oxidation states compared to oxidation state of 4 in the fresh ammonium bisulfite solution.

Ammonium bisulfite has been reported to be a silage preservative. However, those reports do not attribute the antimicrobial acitivities to the synergism of other related inorganic sulfur compounds.

Aqueous ammonium bisulfite treatment shows better economic and other potentials in the storage of moist grains than the presently practiced 100% propionic acid treatment alone. The ammonium bisulfite preserved grains had brighter color, better odors and flavor than the acid treated grains.

In the following examples there are illustrations of the operation of this invention in providing antimicrobial protection for moist wheat, corn and sorghum. These examples are merely illustrative of the broader scope of this invention and it is not intended that the claims of this invention should be limited in any fashion by these examples. Parts and percentages are on a fresh weight basis unless otherwise indicated.

Preliminary Method to Screen Out Effective Treatments on Infected Wheat

Twenty grams of wheat (25% moisture) was sterilized first and inoculated with $10^8$ spores of A. flavus per gram of wheat. After 4 days of incubation at R.T. the infected wheat was subjected to various treatments at 1% by weight of the grain. Examples 1 through 24 show the treatments and their least effective periods on Table I.

TABLE I

| Example | Treatment | pH | Least effective Period (in Weeks) |
|---|---|---|---|
| 1 | 50% $NH_4HSO_3$ stored at ambient temperature for several years | 3.0 | 60 |
| 2 | 100% Propionic Acid | — | 60 |
| 3 | 50% $NH_4HSO_3$ (Fresh) | 5.3 | 1 Moldy |
| 4 | 50% $NH_4HSO_3$ (Fresh) | 3.0 | 2 Moldy |
| 5 | 50% $NH_4HSO_3$ (Fresh) + 20% propionic acid | 3.0 | 60 |
| 6 | 50% $NH_4HSO_3$ (Fresh) + 50% $Na_2S_2O_5$ | 3.0 | 60 |
| 7 | 50% $NH_4HSO_3$ (Fresh) + 50% $Na_2S_2O_5$ | 5.3 | 6 Moldy |
| 8 | 50% $NH_4HSO_3$ Stored at ambient temperature for several months Heated at 55° C. for 2 days | 3.0 | 50 |
| 9 | 50% $NH_4HSO_3$ (Fresh) + 10% $K_2S_3O_6$ | 3.0 | 41 |
| 10 | 50% $NH_4HSO_3$ (Fresh) + 10% $K_2S_3O_6$ + 50% $(NH_4)_2S_2O_3$ | 3.0 | 41 |
| 11 | 50% $NH_4HSO_3$ (Fresh) + 6N $H_2SO_4$ | 3.0 | 55 |
| 12 | 50% $NH_4HSO_3$ (Fresh) irradiated with UV light for 24 hours | 3.0 | 12 moldy |
| 13 | 50% $NH_4HSO_3$ subjected to ultrasonication | 3.0 | 8 moldy |
| 14 | 50% $NH_4HSO_3$ (Fresh) + 1% thiodipropionic acid | 3.0 | 9 moldy |
| 15 | 50% $NH_4HSO_3$ (Fresh) + 1% benzoic acid | 3.0 | 9 moldy |
| 16 | 50% $NH_4HSO_3$ (Fresh) + 1% sorbic acid | 3.0 | 9 moldy |
| 17 | 50% $NH_4HSO_3$ (Fresh) + 10% acetic acid + 10% propionic acid | 3.0 | 55 |
| 18 | 50% $NH_4HSO_3$ (Fresh) + 5% $K_2S_3O_6$ + 5% $Na_2S_4O_6$ | 3.0 | 55 |
| 19 | 50% $NH_4HSO_3$ (Fresh) + 5% $K_2S_3O_6$ + 5% $Na_2S_4O_6$ | 4.9 | 4 moldy |
| 20 | 50% $NH_4HSO_3$ (Fresh) + 10% $Na_2S_2O_6$ | 3.0 | 2 moldy |
| 21 | 50% $NH_4HSO_3$ (Fresh) + 2% $Na_2S_2O_6$ + 2% $K_2S_3O_6$ + 2% $Na_2S_4O_6$ + 2% $(NH_4)_2S_2O_3$ | 3.0 | 1 moldy |
| 22 | 50% $NH_4HSO_3$ (Fresh) + 1% ammonium polysulfide | 3.0 | 3 moldy |
| 23 | 50% $NH_4HSO_3$ (Fresh) + 1 M ammonium diacetate | 3.0 | 2 moldy |
| 24 | 50% $NH_4HSO_3$ (Fresh) + 1 M ammonium dipropionate | 3.0 | 3 moldy |

Treatments of Moist Yellow Corn and Sorghum Followed by Storage in a Partially Closed System.

The moisture contents of 1 kg samples of yellow corn and sorghum were adjusted to 25% and incubated at RT for 4 days to increase the initial microbial loads. The samples were then sprayed with the various aqueous solutions as indicated in Table II at 1% by weight of the grain and stored in brown bottles with the caps placed loosely on top to simulate a partially closed system. The intial microbial load was about $10^8$ organisms per gram of the grain. Propionic acid treated grain was considered as a control to compare the efficacies of the treatments. The treated samples were analyzed at certain time intervals for their microbial loads by a Total Plate Count Method to determine the least effective periods. Examples 25 through 50 in Table II show the results.

TABLE II

Treatments of Yellow Corn

| Example | Treatments | pH | Least Effective Period (in Weeks) |
|---|---|---|---|
| 25 | 50% $NH_4HSO_3$ stored at ambient temp. for several years | 3.0 | 19 |
| 26 | 50% $NH_4HSO_3$ (Fresh) | 3.0 | 2 |
| 27 | 50% $NH_4HSO_3$ (Fresh) | 5.3 | 1 |
| 28 | 50% $NH_4HSO_3$ (Fresh) heated 2 days at 50° C. | 3.0 | 23 |
| 29 | 100% Propionic acid | — | 40 |
| 30 | 50% $NH_4HSO_3$ (Fresh) + 10% $K_2S_3O_6$ | 3.0 | 5 |
| 31 | 50% $NH_4HSO_3$ (Fresh) + 5% 1,2-Propanediol + 2% undecylenic acid | 5.5 | 20 |
| 32 | 50% $NH_4HSO_3$ (Fresh) + 1% ammonium polysulfide | 4.3 | 15 |
| 33 | 50% $NH_4HSO_3$ (Fresh) + 50% $(NH_4)_2S_2O_3$ | 3.0 | 15 |
| 34 | 50% $NH_4HSO_3$ (Fresh) irradiated with UV light for 24 hours | 3.0 | 6 |

TABLE II-continued

| | | pH | |
|---|---|---|---|
| 35 | 50% NH$_4$HSO$_3$ (Fresh) ultrasonicated | 3.0 | 6 |
| 36 | 50% NH$_4$HSO$_3$ (Fresh) used at 1.5% by weight of grain sample | 3.0 | 15 |
| 37 | 50% Na$_2$S$_2$O$_5$ | 3.0 | 5 |
| 38 | 50% NH$_4$HSO$_3$ (Fresh) + 50% Na$_2$S$_2$O$_5$ | 3.0 | 30 |
| 39 | 50% NH$_4$HSO$_3$ (Fresh) + 20% propionic acid | 3.0 | 30 |
| 40 | 50% NH$_4$HSO$_3$ (Fresh) + 50% (NH$_4$)$_2$S$_2$O$_3$ + 10% K$_2$S$_3$O$_6$ | 3.0 | 11 |
| 41 | 50% NH$_4$HSO$_3$ (Fresh) + 10% sodium hexametaphosphate | 3.0 | 9 |
| 42 | 50% NH$_4$HSO$_3$ (Fresh) + 50% (NH$_4$)$_2$S$_2$O$_3$ & SO$_2$ bubbled thru till the pH reached 3.0 | 3.0 | 17 |
| 43 | 50% NH$_4$HSO$_3$ (Fresh) + 10% diammonium imidodisulfonate | 3.0 | 9 |
| 44 | 50% NH$_4$HSO$_3$ (Fresh) + 10% K$_2$S$_3$O$_6$ | 3.0 | 9 |

Treatment of Sorghum

| Example | Treatments | pH | Least Effective Period (in Weeks) |
|---|---|---|---|
| 45 | 100% Propionic acid | — | 28 |
| 46 | 50% NH$_4$HSO$_3$ (Fresh) | 3.0 | 9 |
| 47 | 50% NH$_4$HSO$_3$ (Fresh) + 10% sodium hexametaphosphate | 3.0 | 24 |
| 48 | 50% NH$_4$HSO$_3$ stored at ambient temp. for several months | 3.0 | 15 |
| 49 | 50% NH$_4$HSO$_3$ (Fresh) + 50% (NH$_4$)$_2$S$_2$O$_3$ | 3.0 | 7 |
| 50 | 50% Na HSO$_3$ (Fresh) + acetic acid to pH 3.0 | 3.0 | 14 |

Treatments of Moist Corn Having Various Initial Microbial Loads Followed by Storage in an Open System.

The moisture content of white corn was adjusted to 2% and incubated at RT for varying periods to achieve various initial microbial loads. The samples were then sprayed with various treatments at 1% by weight of the grain and stored at RT in cylindrical glass jars with 24 square inches of open top surface to simulate an open system. The treated samples were analyzed periodically for their microbial loads. Examples 51 thru 54 in Table III show the treatments and the results.

TABLE III

Treatments of White Corn with Various Initial Microbial Loads

| | | | Least Effective Period in Weeks When the Initial Microbial Load is | | | |
|---|---|---|---|---|---|---|
| Example | Treatment | pH | $2 \times 10^5$/g | $4 \times 10^7$/g | $1.8 \times 10^8$/g | $3.8 \times 10^8$/g |
| 51 | 100% Propionic acid | — | 14 | 14 | 14 | 14 |
| 52 | 50% NH$_4$HSO$_3$ (Fresh) + 20% propionic acid | 3.0 | 14 | 14 | 14 | 14 |
| 53 | 50% NH$_4$HSO$_3$ (Fresh) + 20% acetic acid + 20% propionic acid + 5 mg selenium metal per 100 ml solution | 3.0 | 14 | 14 | 14 | 14 |
| 54 | 50% NH$_4$HSO$_3$ (Fresh) + 20% methylene-bis-propionate | 3.0 | 14 | 14 | 14 | 14 |

Although the invention has been described in considerable detail with reference to certain preferred embodiments thereof, it will be understood that variations and modifications can be effected within the spirit and scope of the invention as described hereinabove and as defined in the appended claims. Z

What is claimed is:

1. A process for treating storage grain to inhibit the growth of microorganisms which comprises spraying onto the grain an effective amount of an aqueous solution of ammonium bisulfite containing an amount of sodium hexametaphosphate; the pH, and the ratio of said bisulfite to said phosphate, of said solution, being such that said phosphate is effective to substantially enhance the microorganism growth inhibiting property of said solution by comparision to an aqueous solution containing only a corresponding amount of ammonium bisulfite.

2. A process according to claim 1 wherein said solution is applied in an amount of about 1% by weight to the grain to be treated.

3. A process according to claim 1 wherein said solution has a pH of about 3.0.

4. A process according to claim 3 wherein said solution comprises about 50% NH$_4$HSO$_3$ and about 10% sodium hexametaphosphate.

* * * * *

UNITED STATES PATENT AND TRADEMARK OFFICE
CERTIFICATE OF CORRECTION

PATENT NO. : 4,309,451

DATED : January 5, 1982

INVENTOR(S) : Frederick D. Vidal, Anantharaman Jayaraman

It is certified that error appears in the above-identified patent and that said Letters Patent are hereby corrected as shown below:

Column 1, line 57, after the word aliphatic please insert --carboxylic--

Column 3, line 3, please delete "$CO_2$" and insert --$SO_2$--

Column 4, line 5 please underline A. flavus

Column 5, line 27 please delete "2%" and insert --25%--

Column 5, line 54 please delete "Z"

Signed and Sealed this

Sixth Day of April 1982

|SEAL|

Attest:

GERALD J. MOSSINGHOFF

Attesting Officer — Commissioner of Patents and Trademarks